(No Model.)

G. N. TODD.
PICKER STEM AND MECHANISM FOR OPERATING THE SAME.

No. 483,121. Patented Sept. 20, 1892.

Witnesses.
W. Rossiter
Hall P. Onohundro

Inventor,
George N. Todd
By Jno. G. Elliott
Atty.

UNITED STATES PATENT OFFICE.

GEORGE N. TODD, OF CHICAGO, ILLINOIS, ASSIGNOR TO THE TODD COTTON HARVESTER COMPANY, OF ILLINOIS.

PICKER-STEM AND MECHANISM FOR OPERATING THE SAME.

SPECIFICATION forming part of Letters Patent No. 483,121, dated September 20, 1892.

Application filed November 15, 1886. Serial No. 218,852. (No model.)

*To all whom it may concern:*

Be it known that I, GEORGE N. TODD, a citizen of the United States, residing in Chicago, county of Cook, and State of Illinois, have invented certain new and useful Improvements in Cotton-Harvesters, of which the following is a specification.

This invention relates to an improvement in cotton-harvesters, in which are mechanisms for rotating the picker-stems upon their own axes and introducing them between the limbs of a cotton-plant at regular intervals, the stems being provided with a toothed surface for engaging the cotton and withdrawing it from the boll.

The primary object of this invention is to provide mechanism for supporting and operating picker-stems of novel construction, combining simplicity, durability, and economy in a greater degree than has obtained in the constructions heretofore in vogue.

Other objects are to have a sectional support of such character that adjustment and alterations of the mechanism may be readily effected in which the driving and driven gears are protected and concealed and in which the sections of the supports themselves constitute bearings for the picker-stems and to provide certain other novel details of construction and arrangement of parts, as will be hereinafter more specifically described, and set forth in the claims. I accomplish these objects by the devices illustrated in the accompanying drawings, in which—

Figure 1:
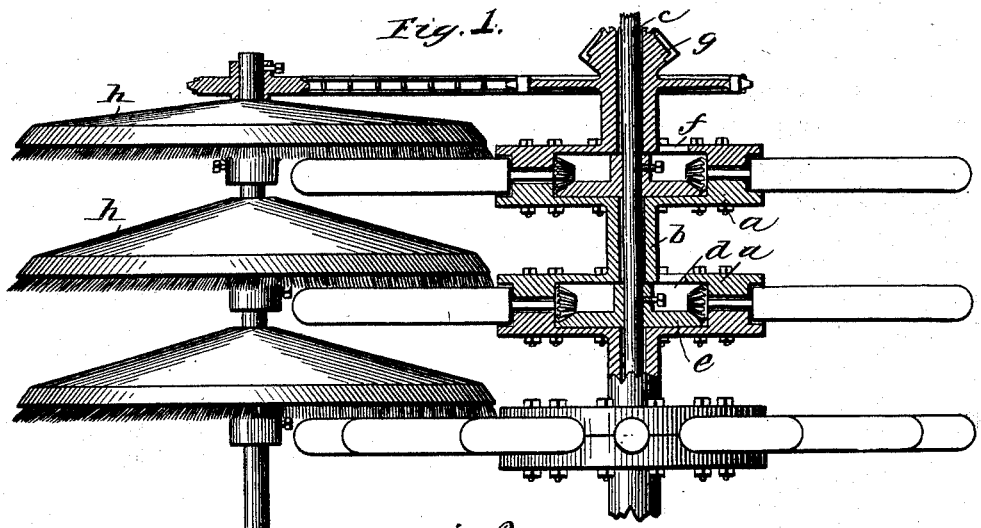
Figure 2:
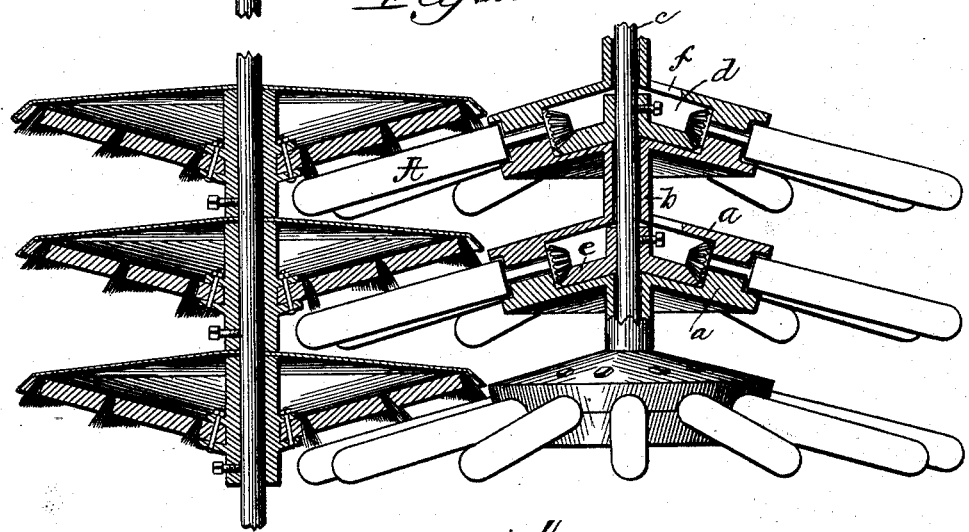
Figure 3:
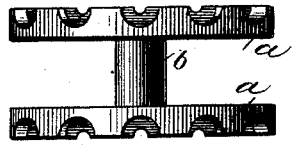
Figure 4:
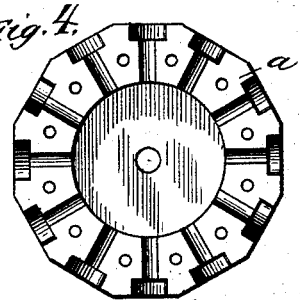

Figure 1 is a detail sectional elevation of a portion of a cotton-harvester embodying my invention, showing mechanism for operating and cleaning the picker-stems and the stems lying in a horizontal plane; Fig. 2, a similar view of a modification of my invention, showing the picker-stems inclining downwardly from their support; Figs. 3 and 4, detail elevation and plan view, respectively, of the picker-stem supports.

Similar letters of reference indicate the same parts in the several figures of the drawings.

The picker-stem support consists of a series of disks $a$, cast, two of them being cast upon the ends of a hub $b$, of the desired length, sleeved upon a stationary vertical shaft $c$, each disk being provided with half-bearings for a series of radially-projecting picker-stems A, the remaining half of the bearing being furnished by the disk of the section of the support next adjoining, the adjacent sections being firmly united together by bolts passing through said disks between the bearings therein. The sections are thus united, thus constituting supports for a number of horizontal series of picker-stems. Between each adjacent pair of disks is formed a chamber $d$, in which is located a circular rack or gear $e$, rigidly secured to the stationary shaft $c$, into which mesh the gears on the inner ends of the picker-stems secured between the disks and having a bearing therebetween near the peripheries thereof.

For convenience of access to the set-screws working through the hubs of these annular gears and securing the same to the stationary shaft I provide small openings $f$ in the upper disk of each adjoining pair or the lower disk of each section, through which a wrench may be inserted to loosen up said screw, so that the sections may be slid vertically upon the shaft $c$ without the necessity of separating one section from another.

For the upper disk on the topmost section is substituted a gear $g$, to which power is applied for rotating the support as a whole about the vertical shaft, and, if desirable, a sprocket-wheel may also be cast therewith for communicating power to the cleaner-brushes $h$, which consist of a series of horizontal rotating disks having one face thereof covered with teeth or bristles which engage the picker-stems during their passage beneath them and brush from them the cotton already gathered; but as these cleaner-brushes in detail constitute part of the subject-matter of a separate application I will not more particularly refer to them herein.

The lowermost series of picker-stems or, if desired, all of the series, as illustrated in Fig. 2, may be made to incline downwardly, so as to lift up the limbs of the plant while working on the same, and thus effectually remove the cotton from fallen or hanging limbs without the danger of injuring the same, and it will be found of especial value to incline the lowermost series because of the tendency of the lowermost limbs of the cotton-plant to lie almost upon the ground, and especially if full bearing. This inclination of the stems may be readily produced by casting the disks $a$ $a$ slightly conical or umbrella-shaped instead of horizontal, as clearly shown in Fig. 2, the cleaner-disks of necessity being inclined in a like manner.

Having described my invention, what I claim, and desire to secure by Letters Patent, is—

1. In mechanism for operating picker-stems, a sectional stem-support the opposing adjoining faces of whose sections are provided with bearings for the picker-stems, substantially as described.

2. In a sectional support for picker-stems, a section composed of two disks, one on each end of a hub, the outer faces of which disks are provided with one-half of bearings for picker-stems, substantially as described.

3. In mechanism for operating picker-stems, a stationary vertical shaft and annular gears or racks rigidly secured to said shaft, in combination with the sectional stem-support mounted on the vertical shaft, mechanism for rotating the same, picker-stems, bearings for said stems between the sections of the support, and gears on the inner ends of said stems, meshing with the gear on the upright stationary shaft, substantially as described.

4. In mechanism for operating picker-stems, a stationary shaft $c$ and the annular racks or gears rigidly secured thereto, in combination with the hub $b$, disks $a$ $a$, cast therewith, said hubs being sleeved on shaft $c$ and the opposing adjacent disks of adjoining sections being bolted together, picker-stems projecting radially from said disks, having bearings therebetween, gears on the ends of said picker-stems engaging the racks $e$, and mechanisms for rotating the said disks about the shaft $c$, substantially as described.

GEORGE N. TODD.

Witnesses:
 W. W. ELLIOTT,
 WILL R. OMOHUNDRO.